United States Patent
Iwasaki

(12) 
(10) Patent No.: US 6,308,007 B1
(45) Date of Patent: Oct. 23, 2001

(54) RECORDING AND REPRODUCING DEVICE

(75) Inventor: Yasuo Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/205,981

(22) Filed: Dec. 4, 1998

Related U.S. Application Data

(63) Continuation of application No. PCT/JP98/01567, filed on Apr. 3, 1998.

(30) Foreign Application Priority Data

Apr. 7, 1997 (JP) .................................................. P09-088559

(51) Int. Cl.$^7$ ............................. H04N 5/76; H04N 5/781; G01R 31/28
(52) U.S. Cl. ............................ 386/116; 386/125; 360/22; 714/770
(58) Field of Search .................. 371/40.2, 40.3, 371/40.4, 40.15; 711/111–114, 4; 386/45, 125, 126, 116; 369/54; 360/22, 61, 47, 53; 714/770; H04N 5/783, 5/76, 5/92, 9/79

(56) References Cited

U.S. PATENT DOCUMENTS

| | | | |
|---|---|---|---|
| 4,761,785 | * | 8/1988 | Clark et al. .............................. 371/51 |
| 5,185,746 | * | 2/1993 | Tanaka et al. ......................... 371/401 |
| 5,331,646 | * | 7/1994 | Kruger et al. ......................... 371/40.4 |
| 5,463,765 | * | 10/1995 | Kakuta et al. ........................ 371/40.2 |
| 5,623,595 | * | 4/1997 | Bailey .................................. 371/40.2 |
| 5,923,839 | * | 7/1999 | Munetoh et al. .................. 371/40.15 |
| 5,954,822 | * | 9/1999 | Yashiro et al. ........................... 714/6 |
| 6,009,498 | * | 12/1999 | Kumasawa et al. .................. 711/113 |
| 6,023,780 | * | 2/2000 | Iwatani ................................. 714/770 |
| 6,029,254 | * | 2/2000 | Andrews ............................. 714/770 |
| 6,076,989 | * | 6/2000 | Kato et al. ........................... 711/114 |

FOREIGN PATENT DOCUMENTS

| | | | |
|---|---|---|---|
| 56-162166 | 12/1981 | (JP) | ................................ G06F/12/04 |
| 1-243268 | 9/1989 | (JP) | ................................ G11B/20/10 |
| 4-51315 | 2/1992 | (JP) | ................................ G06F/3/06 |
| 6-348600 | 12/1994 | (JP) | ................................ G06F/12/08 |
| 8-171459 | 7/1996 | (JP) | ................................ G06F/3/06 |
| 8-202504 | 8/1996 | (JP) | ................................ G06F/3/06 |
| 8-286843 | 11/1996 | (JP) | ................................ G06F/3/06 |
| 9-26854 | 1/1997 | (JP) | ................................ G06F/3/06 |

* cited by examiner

*Primary Examiner*—Thai Tran
(74) *Attorney, Agent, or Firm*—Bell, Boyd & Lloyd LLC

(57) ABSTRACT

A recording and reproducing device comprises a plurality of hard disks H1 through Hp, an error checker 12 for detecting write errors produced in the respective hard disks H1 through Hp, a memory 13 for storing therein a logical address for the hard disk H3 from which the write error is detected, and a computing unit 14 for recovering data to be recorded on the write error-detected hard disk H3, based on data recorded on other hard disks H1, H2 and Hp from which no write errors are detected. When the logical address for the write error-detected hard disk H3 is designated, the post-recovery record data is outputted. According to this, since the write error of each hard disk, which has occurred upon writing, can be automatically corrected, the present device can be continuously activated without missing continuity for a request for recording and reproduction of video/audio data.

2 Claims, 9 Drawing Sheets

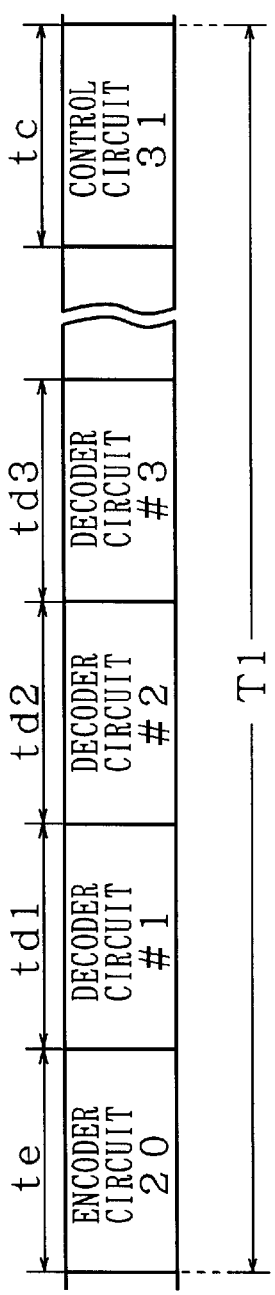
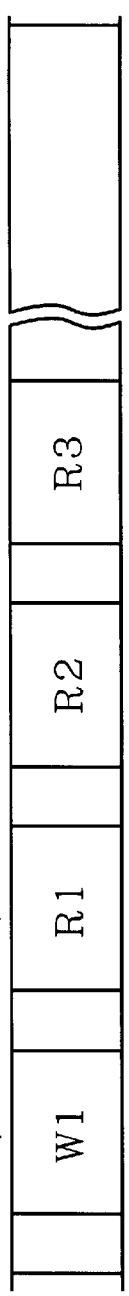
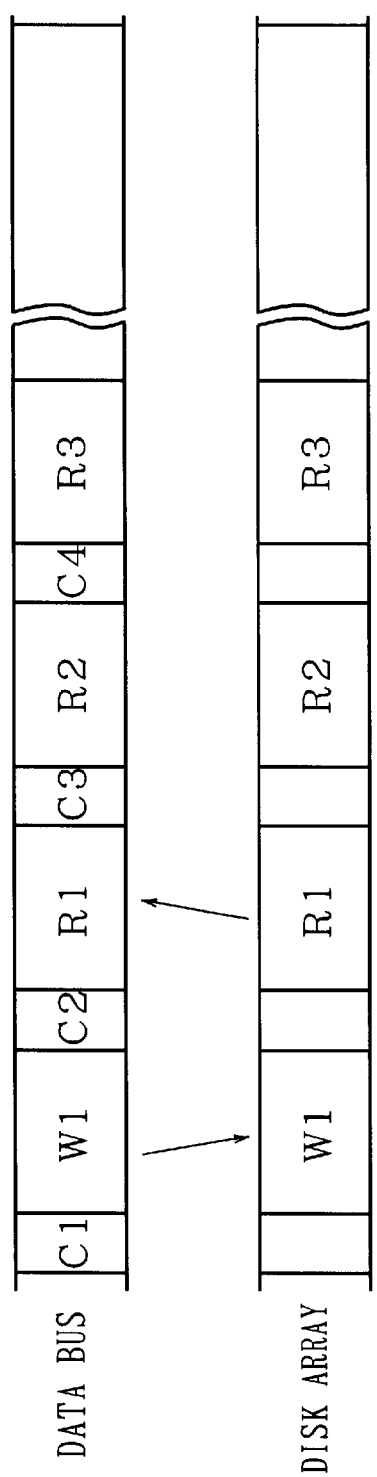
FIG. 3A TIME SLOT
FIG. 3B DATA BUS
FIG. 3C DISK ARRAY
Cn : COMMANDS FROM CONTROL CIRCUIT
Wn : RECORD DATA FROM #nTH ENCODERS
Rn : REPRODUCED DATA TO #nTH DECODERS FIG. 4A
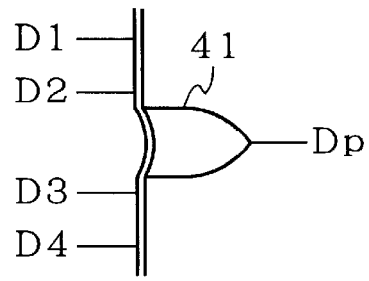
FIG. 4B
| D1 | 0 | 0 | 0 | 0 | 0 | 0 | 0 | 0 | 1 | 1 | 1 | 1 | 1 | 1 | 1 | 1 |
| D2 | 0 | 0 | 0 | 0 | 1 | 1 | 1 | 1 | 0 | 0 | 0 | 0 | 1 | 1 | 1 | 1 |
| D3 | 0 | 0 | 1 | 1 | 0 | 0 | 1 | 1 | 0 | 0 | 1 | 1 | 0 | 0 | 1 | 1 |
| D4 | 0 | 1 | 0 | 1 | 0 | 1 | 0 | 1 | 0 | 1 | 0 | 1 | 0 | 1 | 0 | 1 |
| Dp | 1 | 0 | 0 | 1 | 0 | 1 | 1 | 0 | 0 | 1 | 1 | 0 | 1 | 0 | 0 | 1 |
FIG. 5A
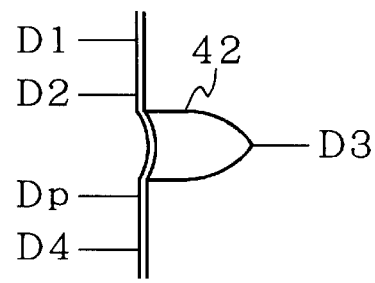
FIG. 5B
| D1 | 0 | 0 | 0 | 0 | 0 | 0 | 0 | 0 | 1 | 1 | 1 | 1 | 1 | 1 | 1 | 1 |
| D2 | 0 | 0 | 0 | 0 | 1 | 1 | 1 | 1 | 0 | 0 | 0 | 0 | 1 | 1 | 1 | 1 |
| Dp | 1 | 0 | 0 | 1 | 0 | 1 | 1 | 0 | 0 | 1 | 1 | 0 | 1 | 0 | 0 | 1 |
| D4 | 0 | 1 | 0 | 1 | 0 | 1 | 0 | 1 | 0 | 1 | 0 | 1 | 0 | 1 | 0 | 1 |
| D3 | 0 | 0 | 1 | 1 | 0 | 0 | 1 | 1 | 0 | 0 | 1 | 1 | 0 | 0 | 1 | 1 |

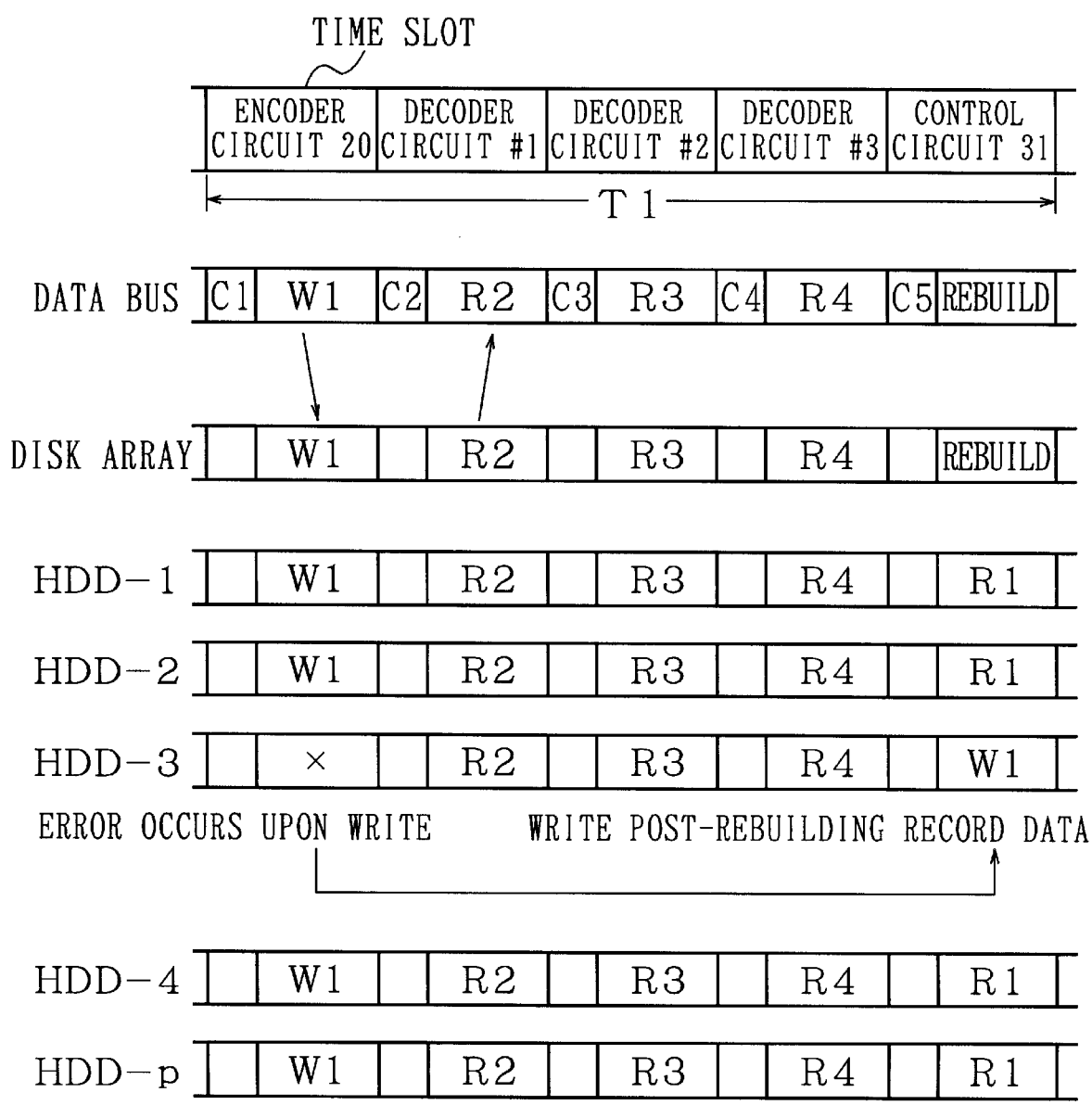

FIG. 10

| (a) DATA1 | (b) DATA2 | (c) DATA3 | (d) DATA4 | (e) DATA5 | (f) DATA6 | (g) DATA7 | (h) |
|---|---|---|---|---|---|---|---|

WHEN RELOCATING OPERATION DRAGS ON, NO SUBSEQUENT DATA IS WRITTEN

| (a) DATA1 | (b) DATA2 | (c) | (d) DATA4 | (e) DATA5 | (f) DATA6 | (g) DATA7 | (h) DATA3 |
|---|---|---|---|---|---|---|---|

4′

× ERROR OCCURS UPON WRITE

RECORDING AND REPRODUCING DEVICE

This application is a continuation of international application number PCT JP/98/01567, filed Apr. 3, 1998, now pending.

TECHNICAL FIELD

This invention relates to a recording and reproducing device suitable for application to a disk array device or the like for an AV (Audio Video) server. More specifically, this invention relates to a recording and reproducing device which is provided with a disk array for activating a plurality of hard disks in parallel and wherein when a write error occurs upon recording, write error-produced data is rebuilt and written using time slots assigned to a controller for controlling the hard disks or the like, whereby error correction can be made without interrupting recording and reproducing operations.

BACKGROUND ART

With a shift toward a multichannel due to the spread of a CATV (cable television) or the like corresponding to one form of cable television services, there has recently been an increasing demand for simultaneously reproducing a plurality of video and audio data from one video/audio data recording and reproducing device as distinct from a conventional VTR (Video Tape Recorder).

In order to meet this demand, a device (AV server) for recording and reproducing or playing back video and audio data by using a plurality of random accessible recording and reproducing media such as a hard disk, etc. is becoming pervasive.

The continuity of data is of importance to this type of device as distinct from a data recording and reproducing device for a computer. That is, if video and audio data necessary within a predetermined time cannot be recorded and played back, then images and voices are intermitted, so that the present device cannot be used as a moving picture/audio recording and reproducing device. Thus, even in the event that a malfunction occurs in a hard disk during recording, it is necessary to continuously receive and record transferred data and sequentially reproduce and transfer data without any delay when a reproduction request is issued.

Further, the shortening of a recovery time at the occurrence of a failure is one performance important to an AV server or the like. An increase in data transfer rate and the provision of a mass-storage hard disk capable of recording data for a long time are mentioned to meet a request for high picture quality and high sound quality.

Therefore, a device has been proposed wherein a plurality of hard disks are operated in parallel to speed up a transfer rate and even in the event of a failure in any hard disk, its reliability can be ensured by recording parity data therein.

FIG. 8 is a diagram showing a configuration of a disk array device provided with such hard disks. As shown in FIG. 8, a bus interface 1 is electrically connected to a data bus 3 so as to input and output record/playback data. A disk array controller 2 is electrically connected to the bus interface 1. Further, five hard disks H1 through H5 for providing disk array form are electrically connected to the disk array controller 2 in the present example.

The input recording data is distributed to and recorded on the hard disks H1 through H4 by the disk array controller 2. Parity data with respect to a plurality of data distributed simultaneously with this and simultaneously recorded are recorded on the dedicated hard disk H5.

When any hard disk fails, such a device can rebuild data by re-computing original data from the left-behind data. Since the missed record data can be recovered owing to its rebuilding, the disk array device can improve the reliability thereof even when it is applied to the aforementioned video/audio data recording and reproducing device.

Further, the parallel operation of the plurality of hard disks H1 through H5 allows an improvement in the transfer rate of input/output data. Thus, a video/audio data recording and reproducing device requiring a high-speed transfer rate which was impossible under the use of a single hard disk, can be configured by using the hard disks H1 through H5 provided in a disk array configuration in a recording and reproducing unit.

FIG. 9 is a conceptional view showing a data recording format on a hard disk H1. As shown in FIG. 9, pieces of data are placed on the disk in concentric-circle form or spiral form. One concentric circle called "track" is divided into data recording sectors each having a suitable size (normally 512 bytes) in the peripheral direction thereof. In the present example, a track 4 is divided into data recording sectors a through g and a spare sector h.

Several tracks 4 are normally integrated into one called "zone". In general hard disks, a structure is adopted which stacks a plurality of disks on one another and rotates the stacked one by one spindle motor. Tracks 4 on each disk, which are located at the same positions in the radial direction thereof, are collectively put into one called "cylinder". The spare sector h is disposed and managed for each zone or cylinder. Only one spare sector h is assigned to one track 4 on one disk in the present example.

FIG. 10 shows a state of a normally-recorded track 4. If no problem occurs in all the data recording sectors a through g upon recording and reproduction, then data DATA1 through DATA7 are normally recorded on the recording sectors a through g as shown in FIG. 10.

FIG. 11 illustrates a state of a track 4' at the time that data are relocated when a write error has occurred. When a malfunction occurs in a data recording sector c upon recording, for example, data is recorded on a spare sector h as shown in FIG. 11. The normally unrecordable and unreproducible data recording sector c results in a defective sector. In the defective sector, a logical address indicative of its position is assigned to the spare sector h. Thereafter, when a logical address for the data recording sector c is designated upon playback, the data on the spare sector h is read. Thus, the reliability of the entire device is improved.

However, in the video/audio data recording and reproducing device provided with the conventional disk array device, when the data recording sector c of the hard disk H3 shown in FIG. 8 is detected as being a defective sector as shown in FIG. 11, for example, the hard disk H3 cannot accept new data therein until a relocating operation (recovering operation) for recording DATA3 on a spare sector h is completed.

Thus, the video/audio data recording and reproducing device requiring the high-speed transfer rate spends time necessary for the relocating operation and thereby misses timing for recording DATA4, DATA5 or the like to be recorded subsequently to the data recording sector c. As a result, data to be recorded on data recording sectors d and e are missed and reproduced data cannot be transferred from the data recording sectors d and e at the request of reproduction.

Therefore, there may be often cases in which the conventional device handles such a problem by constructing the entire device in double form to thereby take a backup measure, or discontinuing working when a malfunction occurs and performing its retrial or preparing a mass-storage memory and temporarily saving data.

Even in this case, however, the device has no choice but to stop the recording and reproducing operations in the course of it. As a result, the continuous recording and reproducing operations cannot be effected on video/audio data. A problem arises in that the loss of such data will lead to a reduction in the reliability of the CATV system.

Therefore, the present invention provides a recording and reproducing device which allows a controller prepared within the device itself to automatically correct a write error of a hard disk, which occurs upon writing, within a time slot, thereby making it possible to continue recording and reproducing operations without loss of continuity for the request of recording and reproduction of video/audio data.

DISCLOSURE OF THE INVENTION

A recording and reproducing device comprises hard disks to each of which recording and reproducing time slots and a control time slot necessary for generation of commands with respect to a record/playback mode are assigned in advance, the hard disks sequentially distributing a plurality of continuous data according to the time slots and recording and reproducing the data thereon, a hard disk provided exclusively for recording and reproducing parity data of the distributedly recorded and reproduced data, means for detecting a write error produced in each hard disk, means for rebuilding data as error data, to be recorded on the hard disk from which the write error is detected, based on the data of the remaining hard disks from each of which the write error is undetected, and the parity data, and means for controlling each hard disk based on the control time slot, and wherein when a write error occurs in one hard disk, the recording of data thereon is continuously performed together with the recording of data on other hard disks without effecting a spare sector reassign operation on the error-produced hard disk, and data corresponding to the write error, the data being rebuilt using the control time slot, is recorded on an arbitrary sector on the hard disk from which the write error is detected.

In the recording and reproducing device of the present invention, data is written using a pre-assigned control time slot when a write error occurs. That is, when the write error has occurred, error data is rebuilt based on data reproduced from all the remaining hard disks from which no write errors are detected, and parity data. The rebuilt data is recorded as data for the write error-detected hard disk by using the time of the control time slot.

Thus, since a write error-produced hard disk does not perform the operation of relocating logical addresses lying in a write error-detected hard disk within a time slot used as for recording and reproduction as in the conventional system, data can be written without interruption. Further, since the assign operation for the logical addresses is not done, the interruption of data reproduction due to this processing is not produced either. Thus, data can be sequentially recorded and played back based on recording and reproducing time slots.

Even when such a sequence that data reproducing time slots exist subsequent to a data recording time slot, is constructed and a logical address for a spare sector (alternate sector) as an alternative to a defective sector is constructed so as to be reassigned during the data recording time slot, data are reproduced from error production-free hard disks by using a control time slot and data to be re-recorded is rebuilt based on these reproduced data. Aside from this, data for an error HDD is rebuilt within a reproducing time slot, based on reproduced data (parity data) with respect to an address to which a reproduction request is made, and the rebuilt data is transferred as reproduced data. By doing so, the continuity of recorded and reproduced data can be secured.

BRIEF DESCRIPTION OF THE DRAWINGS

FIGS. 3A through 3C are respectively timing charts for describing the operation of the video/audio data recording and reproducing device shown in FIG. 2;

FIGS. 4A and 4B depict an example of computations of parity data at data recording;

FIGS. 5A and 5B show an example of computations of data D3 at data rebuilding;

FIG. 6 is a timing chart for describing the operation of a first embodiment at the occurrence of an write error;

FIG. 10 is a diagram showing a state of a normally recorded track 4; and

FIG. 11 is a diagram illustrating a state of a track 4' after relocation and activation of recording data.

BEST MODE FOR CARRYING OUT THE INVENTION

Preferred embodiments of the present invention will hereinafter be described with reference to the accompanying drawings.

Figure 1:
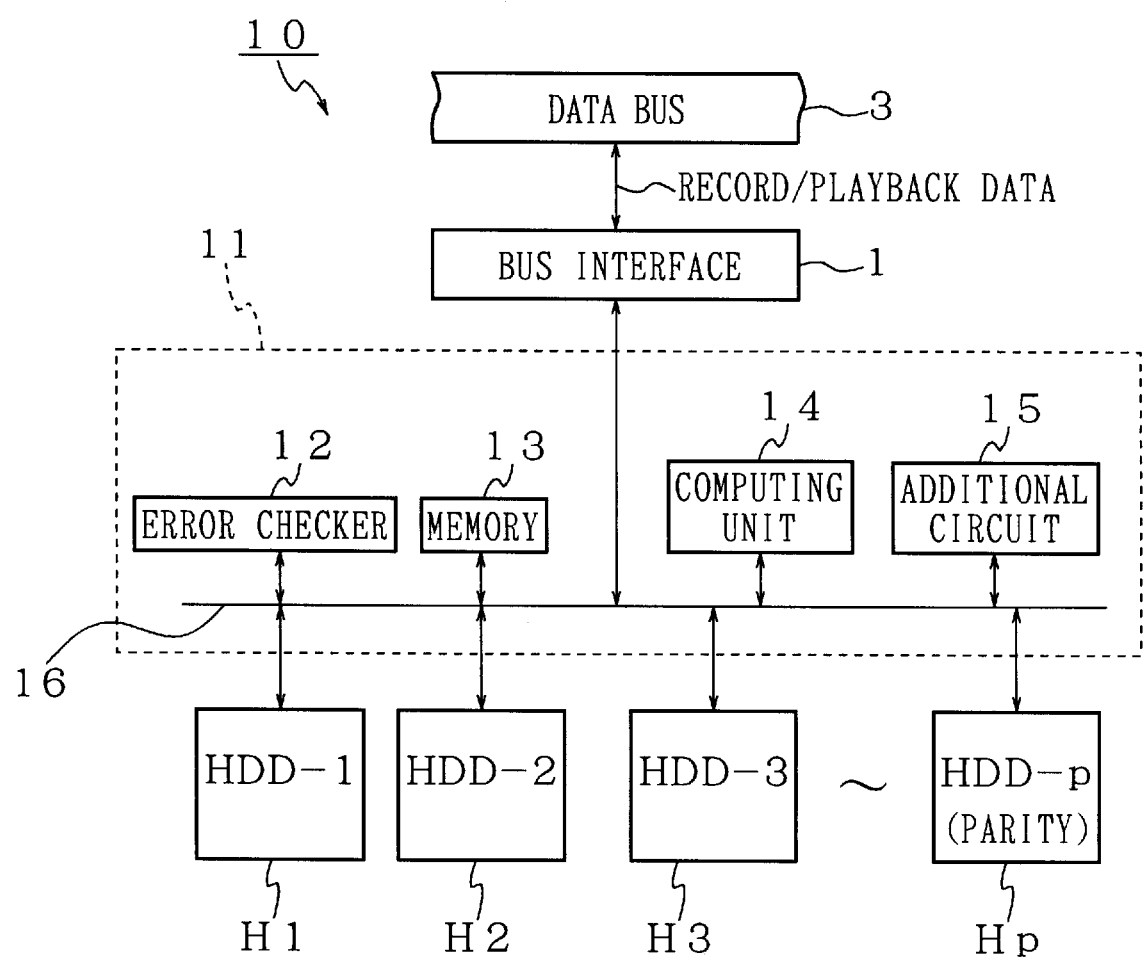
FIG. 1 is a diagram showing a configuration of a recording and reproducing device 10 illustrated as an embodiment.

FIG. 1 is a diagram showing a configuration of a recording and reproducing device illustrated as an embodiment of the present invention. The present embodiment has a disk array for activating a plurality of hard disks in parallel and is one wherein a write error produced at recording is stored, data corresponding to the write error is automatically recovered and re-recorded within a control time slot, thereby making it possible to perform a recording and reproducing operation continuously.

As shown in FIG. 1, the recording and reproducing device 10 is provided with a bus interface 1, a disk array controller 11 and hard disks H1 through Hp. The bus interface 1 is electrically connected to a data bus 1 to perform the input and output of recording or record data. An internal bus 16 of the disk array controller 11 is electrically connected to the bus interface 1. Further, the plurality of hard disks H1 through Hp are electrically connected to the internal bus 16. Record data inputted from the data bus 3 is held in the form of an array of the hard disks H1 through Hp to speed up the record data and dispersedly recorded on the hard disks H1 through H3 by the disk array controller 11. Further, parity data is also recorded thereon simultaneously.

In the present embodiment, the disk array controller 11 is further provided with an error checker 12, a memory 13, a computing unit 14 and another or additional circuit 15 such as a register or the like to prevent a loss of continuity of data. The error checker 12 is electrically connected to the internal bus 16 of the disk array controller 11 so as to detect write errors produced in the respective hard disks H1 through H3 at recording.

The memory 13 is electrically connected to the internal bus 16 so as to store a logical address for each hard disk from which the write error has been detected. Further, the computing unit 14 is electrically connected to the internal bus 16 so as to recover record data to be recorded on each hard disk from which the write error has been detected. The data recovery is executed by computing data recorded on other hard disks from which no write errors have been detected, and parity data recorded on an exclusively-provided hard disk. Parity data obtained by the parity computation is recorded onto the corresponding hard disk Hp. Additional circuit 15 is provided with a functional circuit for activating the error checker 12, the memory 13 and the computing unit 14. The additional circuit 15 includes a register for temporarily storing a reproduction or playback request produced during the recovering of data, and the like.

In the recording and reproducing device according to the present embodiment as described above, data obtained by logically computing the reproduced data of other hard disks H1, H2 and Hp from which no write errors have been detected, is recorded on an alternate or spare sector of an error-produced hard disk by using the control time slot as the record data corresponding to the logical address of, e.g., the hard disk H3 from which the write error has been detected.

First Embodiment

Figure 2:
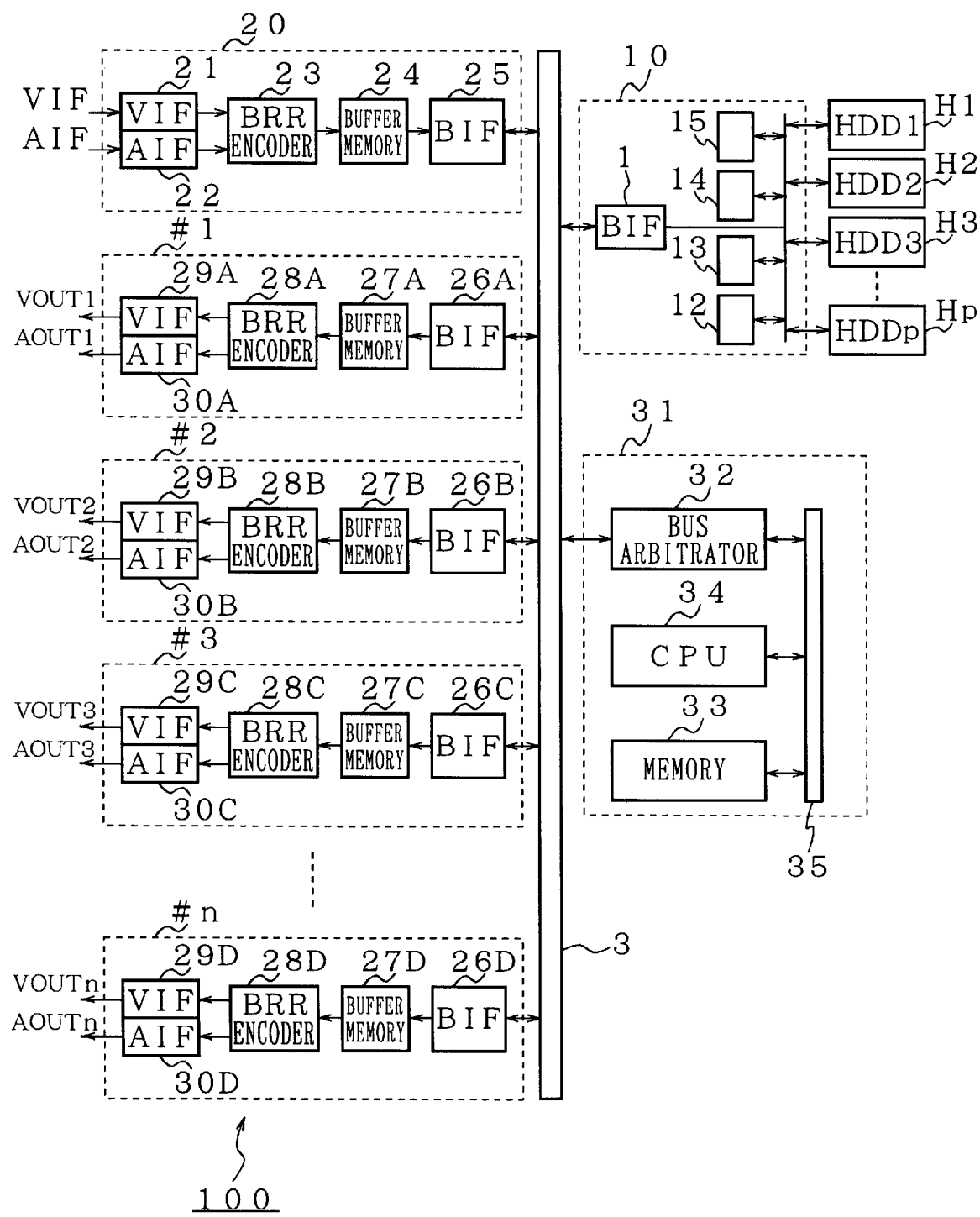
FIG. 2 is a diagram illustrating a video/audio data recording and reproducing device 100 illustrated as an embodiment.

FIG. 2 is a diagram showing the overall configuration of a video/audio data recording and reproducing device 100 illustrated as an embodiment. The video/audio data recording and reproducing device 100 is one applied to a simplified video-on-demand device (NVOD). Thus, the video/audio data recording and reproducing device 100 has a plurality of decoder circuits #1 through #n in addition to an encoder circuit (#1) 20 electrically connected to the data bus 3 as shown in FIG. 2. Further, the video/audio data recording and reproducing circuit 100 includes a data recording/reproducing circuit (hereinafter also called "data recording/reproducing substrate or board") 10 and a control substrate or board (control circuit) 31.

The encoder circuit 20 is provided with a video interface 21, an audio interface 22, an encoder 23, a buffer memory 24 and a bus interface 25. The number of the encoder circuits 20 to be installed may be provided in plural form according to input sources because function-up can be achieved.

The encoder 23 is electrically connected to output stages of the video interface 21 with externally-input video data VIN as an input and the video interface 22 with audio or voice data AIN as an input so that video/audio data is compressed and encoded into such formats as to be capable of being recorded on the hard disks H1 through Hp. The compressed and encoded data is used as the record data.

The buffer memory 24 is electrically connected to an output stage of the encoder 23. The buffer memory 24 temporarily stores the record data therein to make it easy to transfer the data at high speed. The bus interface 25 is electrically connected to an output stage of the buffer memory 24 so that the record data is outputted to a data bus 3 under the control of the control board 31.

The data recording and reproducing board 10 having an array structure is electrically connected to the data bus 3 so that the write error on each hard disk, which has occurred upon recording as described above, is stored therein and record data with respect to the write error is automatically recovered. A computing unit 14 provided within the data recording/reproducing board 10 will be described in detail in FIGS. 3A through 3C.

Further, the first to nth decoder circuits #1 through #n are electrically connected to the data bus 3. The first decoder circuit #1 comprises a bus interface 26A, a bus memory 27A, a decoder 28A, a video interface 29A and an audio interface 30A.

The bus interface 26A is electrically connected to the data bus 3 so as to input reproduced data read from the data recording/reproducing board 10. The buffer memory 27A is electrically connected to an output stage of the bus interface 26A so as to temporarily store the reproduced data therein. The decoder 28A is electrically connected to an output stage of the buffer memory 27A so that the reproduced data is decoded into such formats as to be capable of being displayed on a display unit of a user, i.e., video data Vout and audio data Aout.

The video interface 29A and the audio interface 30A are electrically connected to output stages of the decoder 28A so that the video data Vout1 and audio data Aout1 are respectively outputted therefrom. Incidentally, since the second to nth decoder circuits #2 through #n are identical in configuration to the first decoder circuit #1, their description will be omitted.

Further, the control board 31 is electrically connected to the data bus 3 in such a manner that the reproduced data outputted from the data recording/reproducing board 10 is sequentially or simultaneously transferred to the first to nth decoder circuits #1 through #n. Owing to such data transfer, the video/audio data can be outputted simultaneously by n channels.

Thus, an NVOD (near video on demand) operation broadcasted with a time shift can be implemented by the same video/audio data (materials) or different materials can be sent every decoder circuits #1 through #n so as to perform a multichannel transmitting operation.

The control board 31 comprises a bus arbitrator 32, a memory 33 and a CPU 34 all electrically connected to a CPU bus 35. The bus arbitrator 32 is electrically connected between the data bus 3 and the CPU bus 35 to manage a bus use right so as to avoid a collision between data on the common data bus 3.

The memory 33 is electrically connected to the CPU bus 35 so as to store data about a time slot necessary for this bus arbitration. The time slot corresponds to data obtained by dividing a cyclic sequence T1 every constant times t. If the time slots t are controlled as the reference in this way, then the respective decoder circuits #1 through #n, the encoder circuit 20 and the control board 31 can respectively occupy the data bus 3 only during the time slots t (see FIG. 3A).

Further, the CPU 34 is connected to the bus 35 so as to output control commands C1 through C3 and the like necessary for recording and reproduction of data to the respective boards 20 and the respective decoder circuits #1 through #n.

The operation of the video/audio data recording and reproducing device 100 according to the present embodiment will next be explained with reference to FIGS. 3A through 3C. As its presumption, a recording and reproducing sequence in which decode processing corresponding to three channels is performed within time slots td1 through td3 subsequent to an encode processing time slot te as shown in FIG. 3A, will be explained as an illustrative example. This sequence includes even a control time slot tc for generating control data or the like by the encoder or the like. As shown in FIG. 2, the control commands C1 through C4 or the like generated within the control time slot tc are first outputted from the control board 31 to the encoder circuit 20, the decoder circuits #1 through #n and the data recording/reproducing board 10 respectively.

In the present example, when the control command C1 is outputted to the encoder circuit 20, the right of usage of the data bus 3 is transferred from the control board 31 to the encoder circuit 20. The encoder circuit 20, which has acquired the bus usage right, transfers record data W1 to the data recording/reproducing board 10, based on the control command C1.

Prior to the data transfer referred to above, the encoder 23 in the encoder circuit 20 compresses and encodes externally-input video data VIN and audio data AIN into such a format as to be capable of being recorded on the hard disks H1 through Hp. The encoded record data W1 is inputted to the buffer memory 24 and is placed in a waiting state. Simultaneously with the achievement of the bus use right, the bus interface 25 is electrically connected to the data bus 3 so that the record data W1 is simultaneously and dispersedly recorded onto the hard disks H1 through Hp respectively.

An example to be described below will be explained as one in which input data is dispersedly recorded on four hard disks and parity data of simultaneously dispersedly-recorded data is recorded on the remaining one hard disk.

A four-input logic arithmetic circuit 41 shown in FIG. 4A can be used for the generation of the parity data. When the data recorded on the respective hard disks are defined as D1 through D4, i.e., when data shown in FIG. 4B are inputted to the logic arithmetic circuit 41 shown in FIG. 4A, parity data Dp shown in FIG. 4B can be obtained. The present example shows only the case in which it is represented in the form of one bit to simplify the description thereof. In the example illustrated in FIGS. 4A and 4B, a bit obtained by inverting the sum of the data D1 through D4 is used as the parity data Dp.

The error checker 12 of the disk array controller 11 detects a write error produced in each of the respective hard disks H1 through H3. When the write error is detected, a logical address for the error-produced hard disk is stored in the memory 13.

Record data W1 to be recorded onto the error-produced hard disk is created by the computing unit 14.

When the time slot td1 is reached, the bus usage right changes from the encoder circuit 20 to the decoder circuit #1. In the decoder circuit #1, which has acquired this bus usage right, the bus interface 26A and the data bus 3 are electrically connected to one another based on the control command C2, so that reproduced data R1 is read from the data recording/reproducing board 10. The read reproduced data R1 is temporarily stored in the buffer memory 27A.

The reproduced data R1 is read from the buffer memory 27A to the decoder 28A from which it is decoded into video data Vout and audio data Aout each represented in the form of such a format as to be capable of being displayed on the user's display unit. The decoded video data Vout1 and audio data Aout1 are distributed to and outputted to the video interface 29A and the audio interface 30A respectively.

When the time slot td2 is reached, the bus usage right is transferred from the decoder circuit #1 to the decoder circuit #2.

In the decoder circuit #2 which has acquired the present bus usage right, a bus interface 26B and the data bus 3 are connected to one another based on the control command C3, so that reproduced data R2 is read from the data recording/reproducing board 10. The read reproduced data R2 is processed in a manner similar to the decoder circuit #1 and outputted to other user's display units as video data Vout2 and audio data Aout2 respectively.

When the time slot td3 is next reached, the bus usage right is transferred from the decoder circuit #2 to the decoder circuit #3. In the decoder circuit #3 which has the bus usage right, a bus interface 26C and the data bus 3 are connected to one another based on the control command C4, so that reproduced data R3 is read from the data recording/reproducing board 10. The read reproduced data R3 is processed in a manner similar to the decoder circuit #1 and thereafter outputted to other user's display units as video data Vout3 and audio data Aout3 respectively.

By distributedly placing the time slot T1 over the encoder circuit 20, the decoder circuits #1 through #n and the data recording/reproducing board 10 in this way, the recording of new video and audio (material) data, in-system maintenance, etc. can be simultaneously performed while the video/audio data being played back continuously.

A four-input logic arithmetic circuit 42 shown in FIG. 5A can be used as a computing unit used when data error occurs. For convenience of illustration, the present example shows the case in which data D3 to be recorded on a hard disk H3 is re-constructed or rebuilt by the four-input logic arithmetic circuit 42. That is, the same data as the record data D1, D2, D4 and Dp respectively recorded on their corresponding hard disks H1, H2, H4 and Hp are played back from their corresponding HDDs during a time slot tc, and the reproduced these data are inputted to the four-input logic arithmetic circuit 41. At this time, the record data D3 is outputted as shown in FIG. 5B. That is, parity data is used as error-recovering data D3. This data D3 becomes identical to the data D3 to be recorded shown in FIG. 4B.

The rebuilt data generated by the logic arithmetic circuit 41 shown in FIG. 5A is recorded on a spare sector on an error-produced hard disk, using a period lying within the control time slot Tc shown in FIG. 3A.

The data inputted as shown in FIG. 5A differ from each other according to error-produced places. Thus, when the data D1 has caused an error, for example, the input data result in D2, D3, D4 and Dp and the output data is utilized as D1.

Even in the event that an error occurs in any of the hard disks H1 through H3 upon recording and data cannot be properly recorded on the corresponding disk, the parity data Dp calculated in this way can be rewritten using the time slot tc.

FIG. 6 shows an operation timing chart at the above-described occurrence of write error.

When a write error occurs in the hard disk HDD-3 during write operation under the use of the encoder circuit 20, a defective sector of the hard disk HDD-3, in which the write error has occurred, will not be re-located on a spare sector. Thus, the operation of recording data on the error-produced location of the hard disk is stopped, whereas the operation of recording data on others is not interrupted. The operation of recording data onto other hard disks also remains continued.

As an alternative to this in the present embodiment, the time slot tc assigned to the control board 31 is placed in a waiting state and the data D1, D2, D4 and Dp are read from the hard disks H1, H2, H4 and Hp within the time slot tc. The so-read these data D1, D2, D4 and Dp are inputted to the four-input logic arithmetic circuit 41 from which the re-produced data (data to be recorded) D3 is outputted. The present data D3 is recorded on an arbitrary sector (corresponding to a spare sector on the same track, for example) of the hard disk HDD-3.

The example shown in FIG. 11 will be explained again. The recording of DATA 3 on a spare sector h is performed within the time slot tc assigned to the control board 31 and the recording thereof on a defective sector c is passed. DATA 4 is recorded on a data recording sector d subsequent to the defective sector c and DATA 5 is recorded on a data recording sector e. There is no case in which the timing for data recording is missed to thereby interrupt its recording as in the conventional system.

In the event that the operation of rebuilding data is not completed within the time slot assigned to the control board 31 upon the aforementioned rebuilding, all or some of the remaining data is recorded within a time slot tc of the next sequence. Redundancy of record data W1 is automatically recovered by repeating this several times.

In the video/audio data recording and reproducing device 100 according to the present embodiment as described above, no reassign function in the hard disk is used. It is necessary to manage address mapping for the defective and spare sectors at the inside of a disk array as an alternative to the reassign function. On the other hand, however, record data W1 capable of being handled in one time slot can be collectively recorded on the spare sector as a group or mass.

Thus, the number of times that an information read head (optical pickup or the like) seeks for a hard disk, will not increase within one time slot in a recording and reproducing device which cannot take a time slot enough for an access time. Accordingly, the reproduced data can be read at an extremely high speed.

Second Embodiment

A second embodiment shows one in which even if a reassign operation is performed on a spare sector when an error occurs in a manner similar to the conventional example, it can sequentially obtain reproduced data without interrupting recording and reproducing operations.

Figure 7:
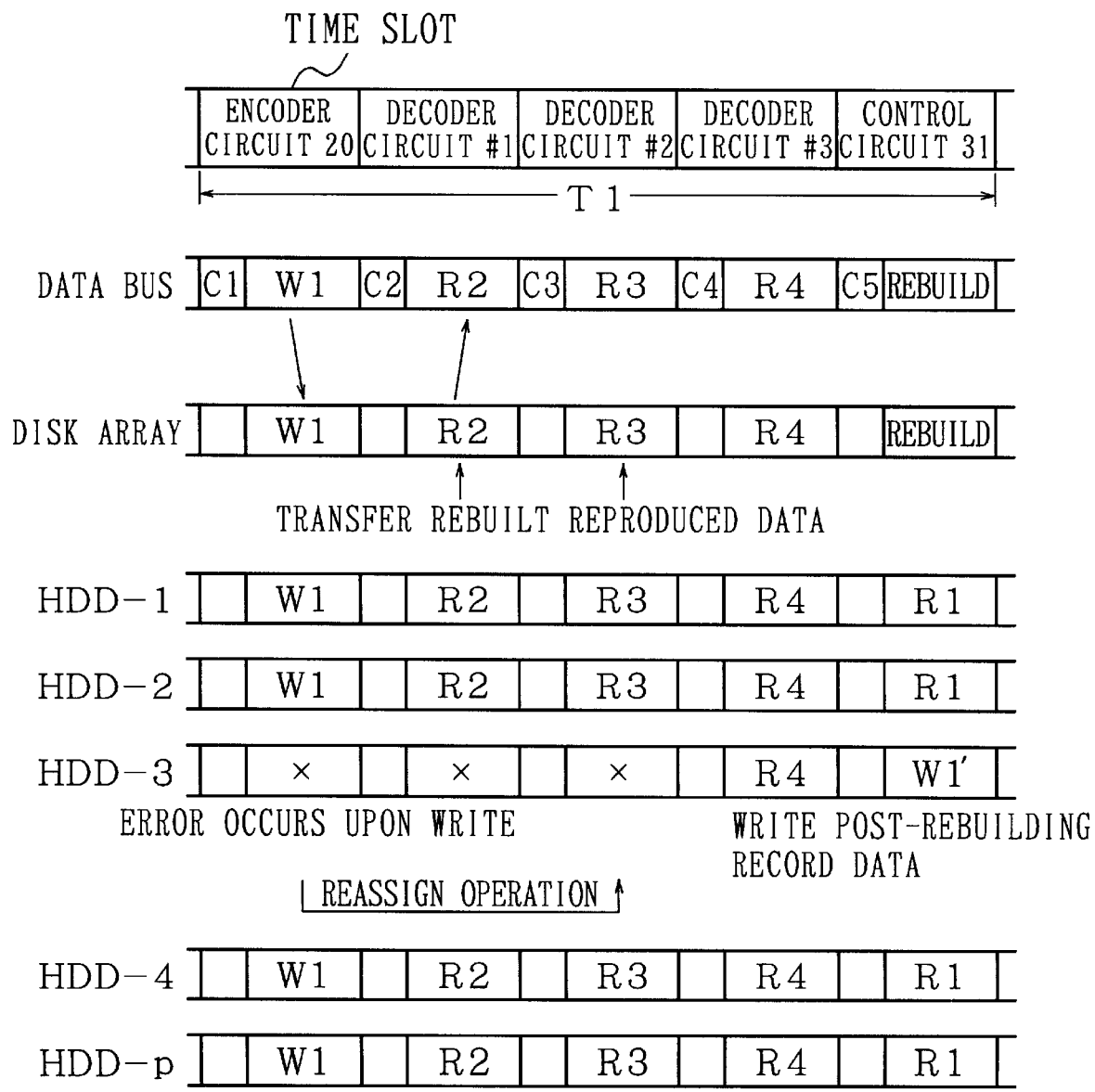
FIG. 7 is a timing chart for describing the operation of a second embodiment at the occurrence of a write error.
Figure 8:
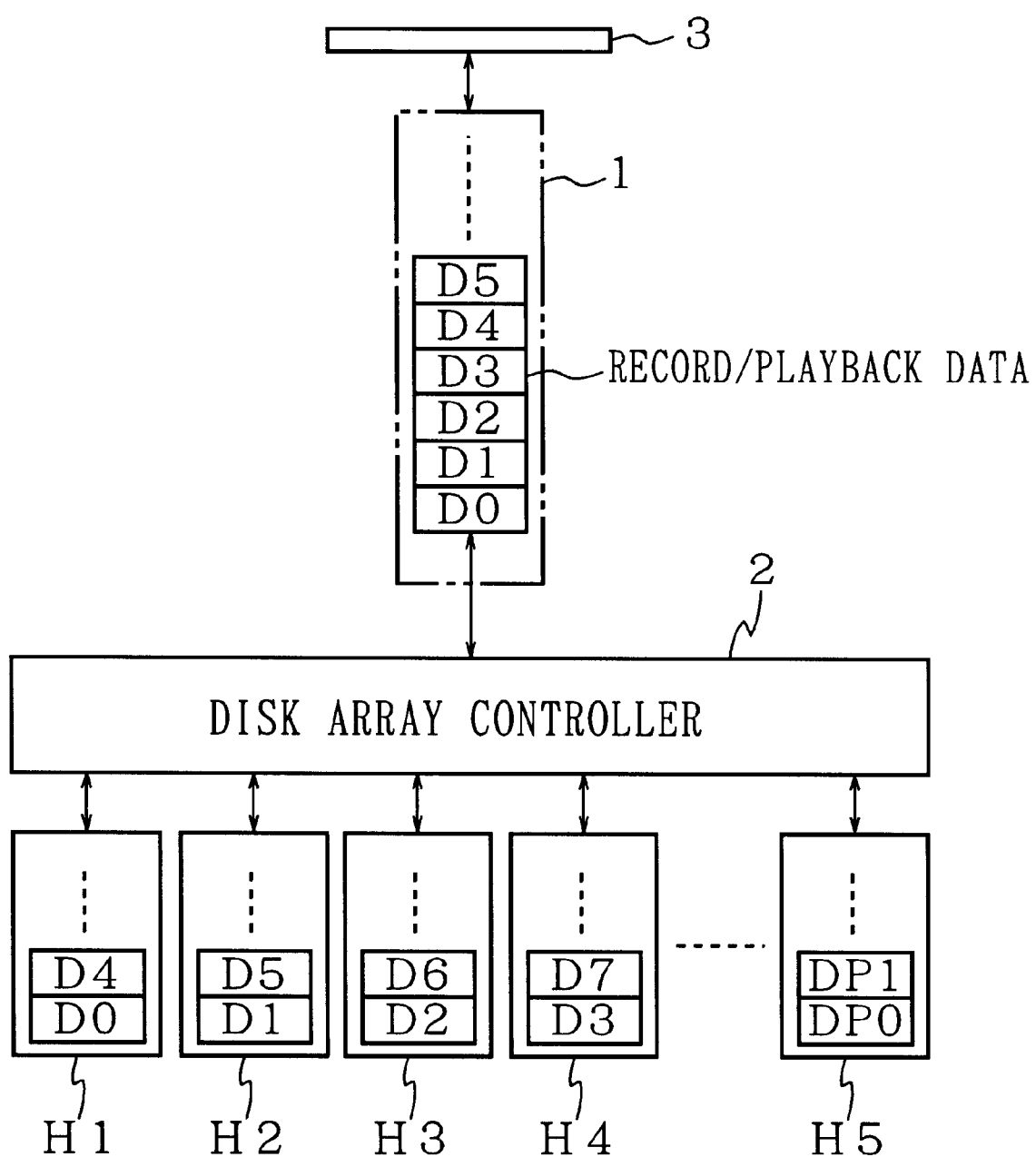
FIG. 8 is a diagram showing an example of a configuration of a conventional disk array device.
Figure 9:
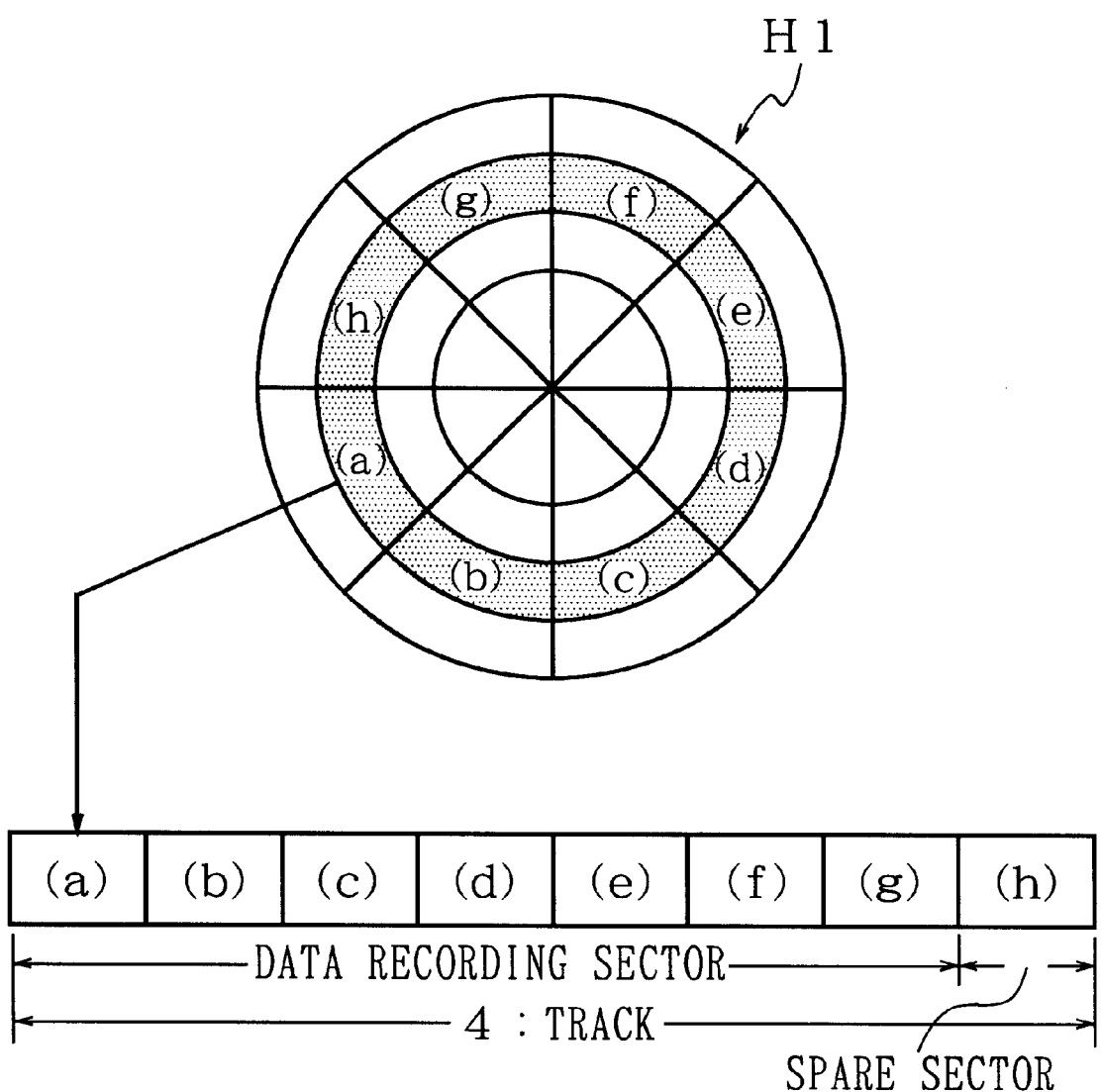
FIG. 9 is a conceptional view of a data recording format on a hard disk.

That is, when a write error occurs in a hard disk HDD-3 as shown in FIG. 7, a video/audio data recording and reproducing device according to the present embodiment serves or performs a reassign function (re-locating operation) of the hard disk itself in a manner similar to the conventional system. As a result, a defective sector is replaced by a spare sector. It is considered that when this reassign operation is made, it will be over the time slots td1, td2 . . . assigned to the encoder circuit 20 as described in FIG. 11.

Therefore, the following control is done:

① A normal recording operation is continuously performed on the remaining hard disks excluding an error-produced hard disk inclusive of parity data.

On the other hand, the error-produced hard disk discontinues the recording operation thereof. Simultaneously with this, a reassign operation is effected on a spare sector.

The example of FIG. 7 shows the case in which the reassign operation is performed over the times of substantially two time slots td1 and td2.

Therefore, a decode process cannot be performed on the hard disk H3 during the time slots td1 and td2. In order to avoid this, the data stored in the hard disk H3 to be reproduced or played back over the time slots td1 and td2 is rebuilt based on data R2 and R3 read from the remaining hard disks during the time slots td1 and td2. A logic arithmetic circuit used therefor and its truth table are represented as shown in FIG. 5B.

During the time slot td1, for example, the data from the hard disk H3, which could not be read out, is reproduced based on normally-reproduced four data R2.

The reproduced data is transferred to a data bus as shown in FIG. 7.

② During a subsequent control time slot tc, data W1 on an error-produced defective sector and each sector which belongs onto the same cylinder, are reproduced. The reproduced four data (which will be defined as R1) are supplied to the logic arithmetic circuit 42 shown in FIG. 5A, where a process for rebuilding the data is performed.

The rebuilt data W1' is recorded on the corresponding reassigned spare sector on the hard disk H3.

Thus, while the hard disk HDD-3 is performing the reassign operation, the record data are respectively recorded on the remaining hard disks HDD-1, HDD-2, HDD-4 and HDDp without performing only the recording operation on the hard disk HDD-3. Thereafter, the operation of rebuilding record data missed from the hard disk HDD-3 is intermittently repeated based on the time slots of the control board 31 after the completion of the reassign operation.

Thus, the recording and transfer of data can be respectively executed without their interruption. Further, the redundancy of other record data which could not be recorded on the hard disk HDD-3, can be automatically recovered to restore the record data W1.

In the present embodiment, some of the record data transferred within the time slots is recorded on the physically non-continuous spare sector as in the conventional system. Therefore, the seek time required to shift or move the read head to the target position upon reproduction is slightly required. On the other hand, since the sector management function set to the inside of the hard disk is used, the disk array has a feature that it eliminates the need for management of address mapping or the like.

That is, although there is produced a delay on data processing if the address mapping function is provided, the present embodiment will not cause this delay. Therefore, even if the number of files to be managed by the hard disks increases, the present embodiment can quickly respond to a data transfer request issued from an external device.

Thus, even if either of the operations shown in FIGS. 6 and 7 is selected, the video/audio data recording and reproducing devices according to the embodiments of the present invention will not interrupt the data recording and reproducing operations, thus causing no risk of intermitting images and voices upon recording and reproducing them.

In the recording and reproducing device of the present invention, as has been described above, data is written using a pre-assigned control time slot when a write error occurs. That is, when the write error has occurred, error data is rebuilt based on data reproduced from all the remaining hard disks from which no write errors are detected and parity data. The rebuilt data is recorded as data of the write error-detected hard disk by using the time of the control time slot.

Thus, since a write error-produced hard disk does not perform the operation of relocating logical addresses lying in a write error-detected hard disk within a time slot used as for recording and reproduction as in the conventional system, data can be written without interruption. Further, since the assign operation for the logical addresses is not done, the interruption of data reproduction due to this processing is not produced either. Thus, data can be sequentially recorded and played back based on recording and reproducing time slots.

In a recording and reproducing device according to the present invention, even when such a sequence that data reproducing time slots exist subsequent to a data recording time slot, is constructed and a logical address for a spare sector (alternate sector) as an alternative to a defective sector is constructed so as to be reassigned during the data recording time slot, data are reproduced from error production-free hard disks by using a control time slot and data to be re-recorded is rebuilt based on these reproduced data. Aside from this, data for an error HDD is rebuilt within a reproducing time slot, based on reproduced data (parity data) with respect to an address to which a reproduction request is made, and the rebuilt data is transferred as reproduced data. By doing so, the continuity of recorded and reproduced data can be secured.

INDUSTRIAL APPLICABILITY

As described above, the recording and reproducing device according to the present invention is extremely suitable for application to a disk array device or the like for an AV server, wherein a plurality of hard disks are activated in parallel to reproduce a plurality of video and audio data simultaneously.

What is claimed:

1. A recording and producing device, comprising:

hard disks, each hard disk having recording and reproducing time slots and a pre-assigned control time slot necessary for generation of commands with respect to a record/playback mode, said hard disks sequentially distributing a plurality of continuous data according to said time slots and recording and reproducing the continuous data thereon;

a hard disk provided exclusively for recording and reproducing parity data of said distributedly recorded and reproduced data;

means for detecting a write error produced in each said hard disk;

means for rebuilding data as error data, to be recorded on the hard disk from which the write error is detected, based on the data of the remaining hard disks from each of which the write error is undetected, and the parity data; and means for controlling each said hard disk based on said pre-assigned control time slot;

wherein when a write error occurs in one hard disk, the recording of data thereon is continuously performed together with the recording of data on other hard disks without effecting a spare sector reassign operation on the error-produced hard disk, and data corresponding to the write error, said data being rebuilt within said controlled time slot, is recorded on an arbitrary sector on the hard disk from which the write error is detected.

2. The recording and reproducing device according to claim 1, wherein when a write error occurs, the operation for reassigning a spare sector is effected on a write error-produced hard disk, and data corresponding to the write error, said data being rebuilt within said control time slot, is recorded on an arbitrary sector on said write error-detected hard disk and when a data playback mode is interrupted according to the reassign operation, said data is rebuilt as data outputted from a hard disk at its interruption, based on the data reproduced from the remaining hard disks.

* * * * *